(12) United States Patent
Beyfuss et al.

(10) Patent No.: US 11,541,447 B2
(45) Date of Patent: Jan. 3, 2023

(54) BEARING CAGE

(71) Applicant: AKTIEBOLAGET SKF, Gothenburg (SE)

(72) Inventors: Berthold Beyfuss, Wasserlosen-Kaisten (DE); Hans-Juergen Friedrich, Königsberg-Römershofen (DE); Alfred Radina, Poppenlauer (DE); Jonas Schierling, Hassfurt (DE); Maximilian Soellner, Bundorf (DE); Stefan Volpert, Bergrheinfeld (DE)

(73) Assignee: AKTIEBOLAGET SKF, Gothenburg (SE)

( * ) Notice: Subject to any disclaimer, the term of this patent is extended or adjusted under 35 U.S.C. 154(b) by 202 days.

(21) Appl. No.: 16/781,533

(22) Filed: Feb. 4, 2020

(65) Prior Publication Data
US 2020/0306816 A1    Oct. 1, 2020

(30) Foreign Application Priority Data

Mar. 25, 2019  (DE) .......................... 102019204010.1

(51) Int. Cl.
*B21D 53/12* (2006.01)
*F16C 33/52* (2006.01)

(52) U.S. Cl.
CPC .............. *B21D 53/12* (2013.01); *F16C 33/52* (2013.01)

(58) Field of Classification Search
CPC ........ B21D 53/12; B21D 53/10; B21D 28/02; B23P 15/003; F16C 33/52; F16C 23/084; F16C 2220/84; F16C 33/4629; F16C 33/4676; F16C 33/4647; F16C 33/3868; F16C 33/541; F16C 33/542; F16C 33/543; F16C 43/065; Y10T 29/49636; Y10T 29/49643; Y10T 29/4968; Y10T 29/49682; Y10T 29/49686
USPC ... 29/898.065, 898.064, 898, 898.04, 898.67
See application file for complete search history.

(56) References Cited

U.S. PATENT DOCUMENTS

| | | | | |
|---|---|---|---|---|
| 1,699,571 A | * | 1/1929 | Rouanet | B21K 1/05 29/898.067 |
| 3,431,037 A | * | 3/1969 | Benson | F16C 33/543 384/580 |
| 3,494,684 A | * | 2/1970 | Benson | F16C 33/4676 384/580 |
| 3,878,705 A | * | 4/1975 | Iffland | B21D 53/12 72/333 |
| 4,623,270 A | * | 11/1986 | Olschewski | F16C 33/4635 29/898.15 |

(Continued)

*Primary Examiner* — Sarang Afzali
*Assistant Examiner* — Darrell C Ford
(74) *Attorney, Agent, or Firm* — J-Tek Law PLLC; Scott T. Wakeman; Mark A. Lissai

(57) ABSTRACT

A method for manufacturing a bearing cage includes providing a bearing cage blank made from a metal plate, the cage blank including a cylindrical flange extending from a disk-shaped wall, punching a plurality of first openings through the cylindrical flange in a first direction to form a plurality of snap surfaces, and punching a plurality of second openings through the cylindrical wall in a second direction opposite the first direction to form a plurality of pockets. The second openings intersect at least two of the first openings, and punching the pockets removes a body of material from between the at least two of the first openings. Also a bearing cage formed by the method.

9 Claims, 3 Drawing Sheets

(56) References Cited

U.S. PATENT DOCUMENTS

| | | | | |
|---|---|---|---|---|
| 6,039,475 | A * | 3/2000 | Furukawa | F16C 33/543 |
| | | | | 384/580 |
| 9,587,679 | B2 * | 3/2017 | Hirata | F16C 43/083 |
| 11,248,659 | B2 * | 2/2022 | Hainz | F16D 3/223 |
| 11,293,484 | B2 * | 4/2022 | Ishikawa | F16C 33/467 |
| 2004/0156571 | A1 * | 8/2004 | Kotani | F16C 33/543 |
| | | | | 384/580 |
| 2010/0278471 | A1 * | 11/2010 | Oishi | F16C 33/541 |
| | | | | 384/572 |
| 2011/0091144 | A1 * | 4/2011 | Oishi | F16C 33/543 |
| | | | | 384/548 |
| 2013/0148919 | A1 * | 6/2013 | Matsuo | B22F 5/106 |
| | | | | 384/572 |
| 2015/0036961 | A1 * | 2/2015 | Mano | F16C 19/26 |
| | | | | 384/575 |
| 2015/0174639 | A1 * | 6/2015 | Beyfuss | F16C 33/543 |
| | | | | 29/898.067 |
| 2015/0260226 | A1 * | 9/2015 | Linden | F16C 33/545 |
| | | | | 384/575 |
| 2016/0333936 | A1 * | 11/2016 | Kono | F16C 33/541 |
| 2022/0154767 | A1 * | 5/2022 | Isobe | F16C 33/4676 |

* cited by examiner

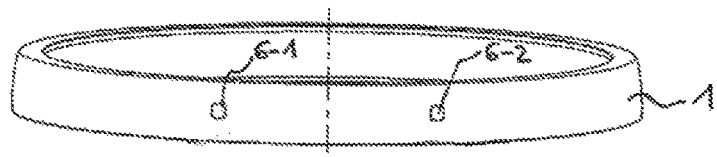
Fig. 3
 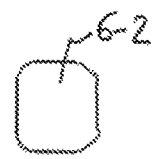
Fig. 4  Fig. 5
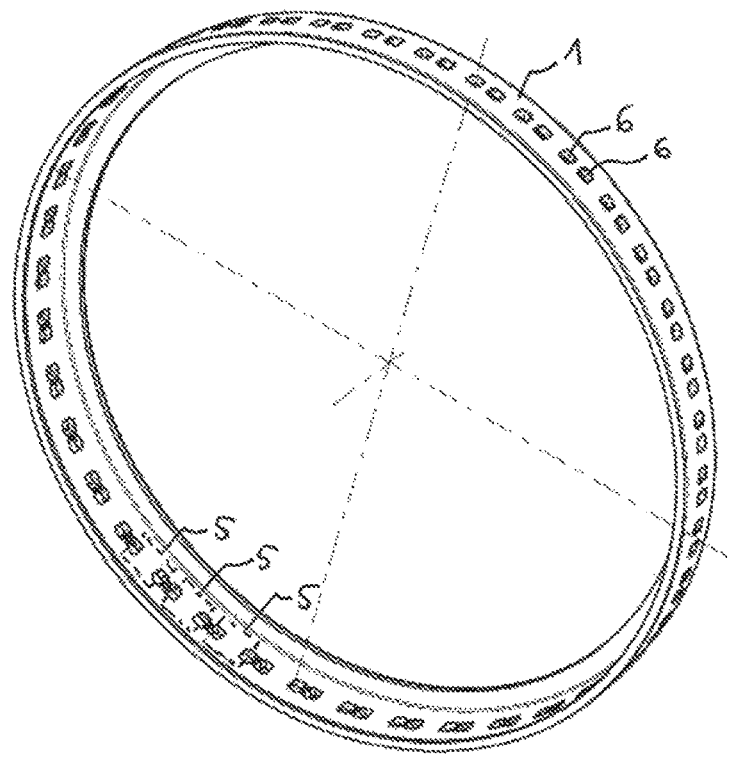
Fig. 6

BEARING CAGE

CROSS-REFERENCE

This application claims priority to German patent application no. 10 2019 204 010.1 filed on Mar. 25, 2019, the contents of which are fully incorporated herein by reference.

TECHNOLOGICAL FIELD

The present disclosure is directed to a bearing cage for a rolling-element bearing that includes snap surfaces and a to a method of forming such a bearing cage.

BACKGROUND

Rolling-element bearings often include bearing cages for holding and guiding rolling elements between an inner and outer ring. In order to arrange the rolling elements in the bearing cage, it is usual to manufacture cages that include snap surfaces for snapping-in of the rolling elements.

To date the snap surfaces of such cages are manufactured by a peeling or paring or chipping process. In such a process a cage blank is first manufactured, preferably in pot shape. The pocket contour is then punched out of the blank in a manner corresponding to the number of pockets required. Here material is left at the position of the bridge, where the snap surface will later be formed. The remaining material that is to serve as snap surface is then abraded or pared or chipped off in a manner corresponding to the number of pockets. Chips arise due to this scraping or paring process. These chips partially adhere due to the lubricant that is required for the paring process, and are thereby difficult to remove. Furthermore, chips falling in an uncontrolled manner can block the function of the chip-cutting tool or damage the bearing during operation.

SUMMARY

It is therefore an aspect of the present disclosure to provide a bearing cage and a method for manufacturing a bearing cage wherein chip formation is reduced.

The disclosed bearing cage for a rolling-element bearing includes two side rings that are connected to each other via bridges, and pockets are formed between the bridges, in each of which pocket a rolling element is receivable. At least one snap surface is formed on the bridges. The snap surface is used to fix the rolling elements after they are introduced into the pockets. Here during introduction into the pockets the rolling elements snap into the snap surfaces.

In order not to generate any chips that arise due to a paring or chipping process, in the disclosed bearing cage both the pockets and the snap surfaces are punched. In cages known to date the pockets are specifically punched, however the remaining material on the snap surface is subsequently pared by machining. This machine chipping or paring has the disadvantage that lubrication must be provided during the process and the chips are difficult to remove from the punching tool and from the cage. Since in the disclosed bearing cage both the pockets and the snap surfaces are punched, no machine chipping method is required, with the result that no chips arise.

According to one embodiment the pocket is punched from radially inward to radially outward, and the at least one snap surface is punched from radially outward to radially inward. In this case in particular the at least one rolling element is snappable-in from radially outward into the pocket. Alternatively the pocket can be punched from radially outward to radially inward wherein in this case the at least one snap surface is punched from radially inward to radially outward. The at least one rolling element can then be snapped-in into the pocket from radially inward. The pockets and the snap surfaces are thus always punched in different directions.

In this way a punching or rupture surface that arises during punching of the snap surfaces is removed again by the punching of the pockets. This is the case on the one hand since the snap surfaces and the pockets are punched-out from two different directions. On the other hand this is achieved since the pockets are punched-out after the punched surfaces. In this way the snap surfaces that come in contact with the rolling elements are particularly worked precisely, without punching or rupture surfaces.

If the pockets are punched from outside to inside, this offers the advantage that the shear zone in this case is outward on the metal plate, i.e., where the punch penetrates into the metal plate. The snap surface of the rolling elements thus abuts against the shear zone and thereby permits the snap dimension to be reliably maintained According to a further embodiment the bearing cage is manufactured from a pot-shaped bearing-cage blank. The pot-shaped bearing-cage blank already offers the basic shape that is required for the bearing cage. Furthermore, the pockets and the snap surfaces can be punched from such a bearing-cage blank in a simple manner.

At least one undercut can be provided on the snap surface. Due to this undercut an overlap can be prevented from arising with the already-punched snap surfaces during punching-out of the pockets. Here an undercut is preferably provided on both sides of each snap surface.

According to a further embodiment the snap surface is punched in a direction perpendicular to the bearing cage axis or angled with respect to the bearing cage axis. Depending on the desired shape of the snap surface a perpendicular or angular orientation can be selected.

The punched parts can be removed as waste in a simple manner in comparison to chips. Furthermore less lubrication is required as compared to the previous process of paring or chip-cutting. In addition, compared to the previous machine chipping, the punching-out reduces tool wear, since a punch for the snap surface is less stressed than a punch as required for paring. In addition the manufacturing of the bearing cage is faster in comparison to a manufacturing method used to date with machine chipping.

According to a further aspect a method is disclosed for manufacturing a bearing cage as is described above. The method includes at least the following successive steps:
1. providing of a pot-shaped bearing-cage blank made from a metal plate;
2. punching out of at least one snap surface
3. punching out of the pocket belonging to the punched-out snap surface.

Due to the fact that both the snap surfaces and the pockets are punched out, a machine chipping of the snap surfaces can be avoided. Therefore no chips that can damage the bearing arise during manufacturing of the bearing cage.

In particular in step 2 all snap surfaces are punched, and subsequent to the punching-out of the snap surfaces a punching-out of all pockets occurs. For this purpose punches can also be used that simultaneously punch out more than one snap surface and more than one pocket.

According to a further embodiment the pockets are punched out in a direction opposite the punching direction of the snap surfaces, and the snap surfaces are punched out in a punching direction that corresponds to the direction of the snapping-in of the rolling elements. Depending on the arrangement, the rolling elements here can be snapped in from radially inward to radially outward or from radially outward to radially inward.

In particular the rolling elements can be spherical-roller-bearing rollers. However, any other type of rolling elements can also be used in such a bearing cage.

Further advantages and advantageous embodiments are specified in the description, the drawings, and the claims. Here in particular the combinations of features specified in the description and in the drawings are purely exemplary, so that the features can also be present individually or combined in other ways.

In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWINGS

FIG. 3 is a perspective view of the bearing-cage blank of FIG. 2 including two punched-out snap surfaces.

FIG. 4 is an enlarged view of the left punched-out snap surface of FIG. 3.

FIG. 5 is an enlarged view of the right punched-out snap surface of FIG. 3.

FIG. 6 is a perspective view of the bearing-cage blank of FIG. 2 including a plurality of punched-out snap surfaces.

DETAILED DESCRIPTION

In the following, identical or functionally equivalent elements are designated by the same reference numbers.

Figure 1:
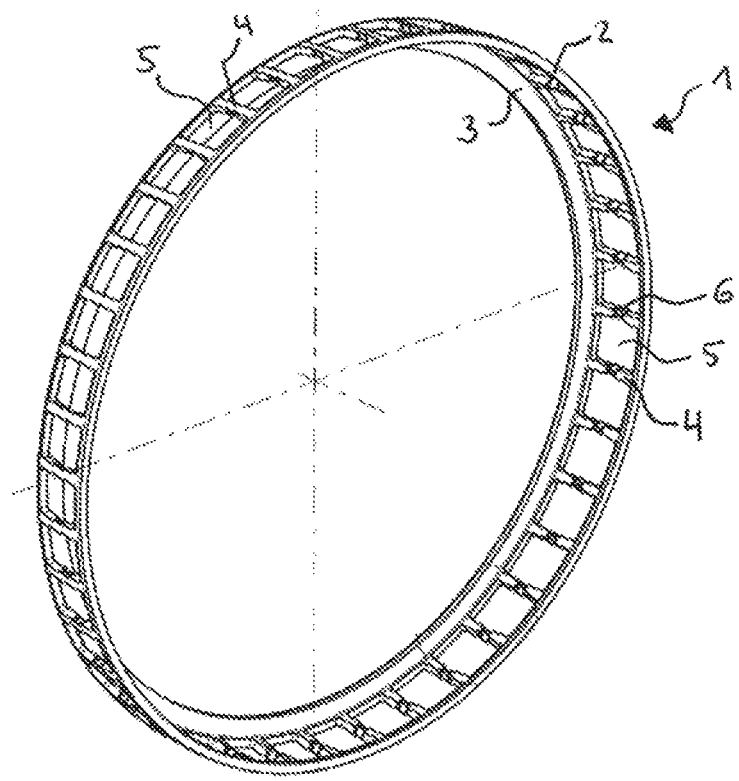
FIG. 1 is a perspective view of a bearing cage.

FIG. 1 shows a bearing cage 1 for a rolling-element bearing. The bearing cage 1 includes two side rings 2, 3 that are connected to each other via bridges 4. Between the bridges 4, pockets 5 are formed that are configured for receiving at least one rolling element. On each of the bridges 4 at least one snap surface 6 is formed into which the rolling elements can be snapped-in.

In bearing cages used to date, the pockets 5 are punched out, and the snap surfaces 6 are formed by a machine chipping process. Here material on the bridges 4 is removed in order to form the snap surfaces 6.

Chips arise due to this machine chipping process. Due to the lubricant that is required for the chip-forming process, these chips can adhere and can thereby only be removed with difficulty. Furthermore, chips falling in an uncontrolled manner can block the function of the chip-cutting tool. If chips remain on the bearing cage, they can damage the rolling-element bearing in operation.

In order to avoid these disadvantages, in the disclosed bearing cage 1 both the pockets 5 and the snap surfaces 6 are punched. This manufacturing process is described in more detail in connection with FIGS. 2 to 10.

Figure 2:
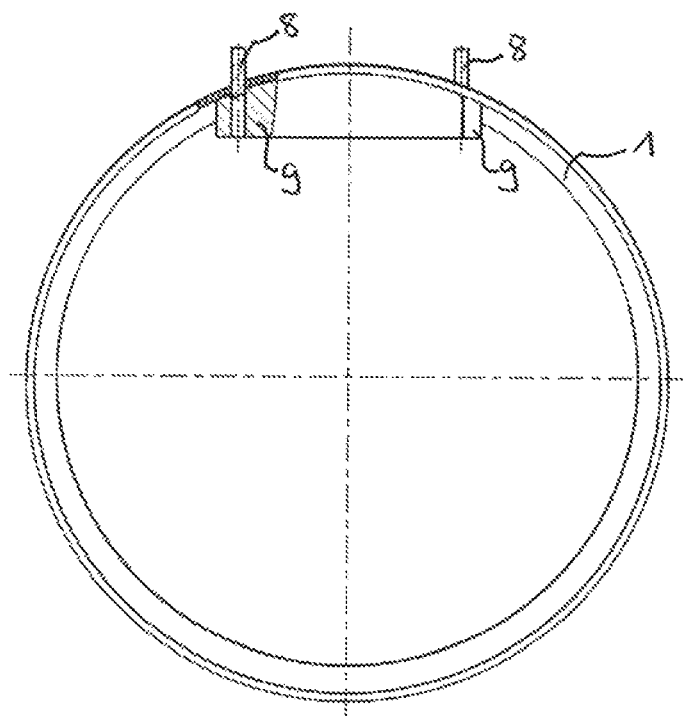
FIG. 2 is a plan view of a bearing-cage blank including a punching tool for punching out bearing cage snap surfaces.

FIG. 2 shows a bearing cage 1 in its raw state as a pot shaped metal plate. In order to punch out the snap surfaces 6 in a first step, a punching tool is used that is comprised of a punch 8 and a punch die 9. As shown in FIG. 2, the punching tool can include two punches 8 and two punch dies 9 in order to simultaneously punch out two snap surfaces. Here the snap surfaces 6 are punched out from radially inward to radially outward. The rolling elements can then also be inserted into the finished bearing cage 1 from radially inward.

After the first step of the punching process, the bearing-cage ring 1 includes two punched-out snap surfaces 6-1 and 6-2, as depicted in FIG. 3. One possible shape of the two snap surfaces 6-1 and 6-2 is depicted in FIGS. 4 and 5, wherein the left side in FIG. 4 and the right side in FIG. 5 each represents the actual snap surface.

The punching process is repeated until the bearing cage 1 includes a plurality of circumferentially distributed punched-out snap surfaces 6, as shown in FIG. 6.

Following the punching-out of the snap surfaces, in a next step the pockets 5 are punched out of the bearing cage 1. The pockets 5 overlay the punched-out snap surfaces 6. This is depicted in FIG. 6, wherein the pockets 5 are depicted in broken lines.

Alternatively two snap surfaces 6 and subsequently the pockets 5 overlying these can always be punched out. This is then repeated for each pocket 5.

Figure 7:
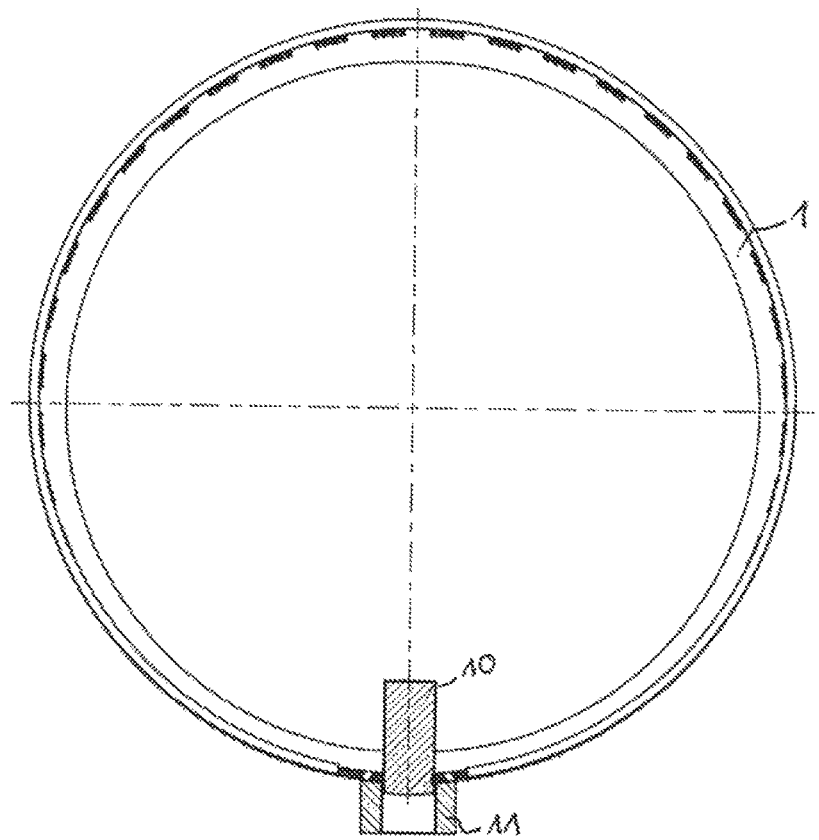
FIG. 7 is a plan view of the bearing-cage blank of FIG. 6 including a punching tool for punching out the pockets.

When the snap surfaces 6 have been punched out from radially inward to radially outward, the pockets 5 are punched from radially outward to radially inward. This is depicted in FIG. 7.

If the pockets 5 are punched from radially outward to radially inward, this has the advantage that the shear zone 12 that arises due to the punching is outside the metal-plate surface of the bearing cage 1, i.e., where the punch 10 penetrates into the metal plate. The snap surface 6 of the rolling elements thus abuts against the shear zone 12 and thereby permits a reliable maintaining of the snap dimension.

Due to the punching of the snap surfaces 6 and of the pockets 5 from different sides, a punching- or rupture-surface that arises during punching of the snap surfaces 6 is removed again by the punching of the pockets 5.

Alternatively, provided the snap surfaces 6 are punched from radially outward to radially inward, the pockets 5 are punch from radially inward to radially outward.

Figure 8:
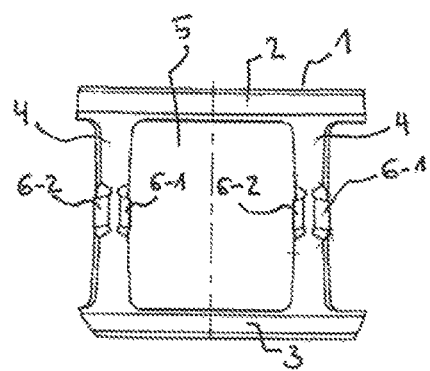
FIG. 8 is a detail view of a pocket of the bearing cage of FIG. 7 including bridges and punched-out snap surfaces.
Figure 9:
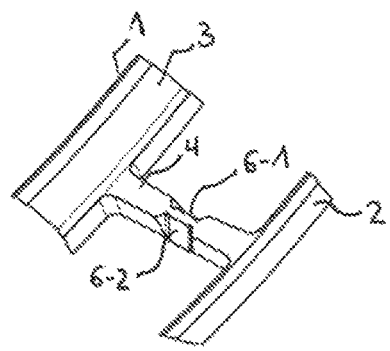
FIG. 9 is a perspective view of the pocket of FIG. 8.

Analogously to the punching-out of the snap surfaces 6, for the punching-out of the pockets 5 a punching tool is used that is comprised of a punch 10 for punching the pockets 5 and a punch die 11. After the punching-out of the pockets 5, between the two side rings 2, 3 the bearing cage 1 includes bridges 4 that are formed by the punching out of the snap surfaces 6 and the subsequent punching out of the pockets 5. This is depicted in FIG. 8 and FIG. 9.

Figure 10:
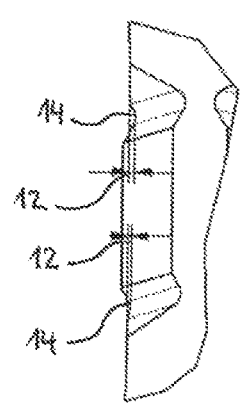
FIG. 10 is a side view of a bridge of the pocket of FIG. 8 and FIG. 9.

During punching-out of the snap surfaces 6 a small undercut can be applied to the punch 9. This leads to an undercut 14, as is depicted in FIG. 10. This undercut 14 prevents an overlap with the already-punched snap surfaces 6 from arising during punching-out of the pockets 5. In this way the dimensional accuracy of the snap surfaces 6 can be improved.

Since the disclosed bearing cage is manufactured by punching out both the pockets and the snap surfaces, a chip-free producing of the bearing cage is possible. On the one hand the manufacturing of the bearing cage is faster in comparison to machining methods, and on the other hand damage in the rolling-element bearing due to chips of the bearing cage is reduced.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cages.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing cage
2, 3 Side ring
4 Bridge
5 Pocket
6 Snap surface
8 Punch
9 Punch die
10 Punch
11 Punch die
12 Shear zone
14 Undercut

What is claimed is:

1. A method for manufacturing a bearing cage comprising:
   providing a bearing cage blank made from a metal plate,
   punching a plurality of first openings through the metal plate in a first direction to form a plurality of snap surfaces; and
   after punching the plurality of first openings, punching a plurality of second openings through the metal plate in a second direction opposite the first direction to form a plurality of pockets, the second openings intersecting at least two of the first openings and removing a body of material from between the at least two of the first openings.

2. The method according to claim 1,
   wherein the cage blank comprises a cylindrical flange extending from a disk-shaped wall,
   wherein the punching the first plurality of openings comprises punching the plurality of first openings through the cylindrical flange, and
   wherein the punching the plurality of second openings comprises punching the plurality of second openings through the cylindrical wall.

3. The method according to claim 2, wherein the punching of the plurality of first openings is completed before the punching of the plurality of second openings begins.

4. The method according to claim 1,
   wherein the first plurality of openings are punched in a radially outward direction and the second plurality of openings are punched in a radially inward direction.

5. The method according to claim 1,
   wherein the first plurality of openings are punched in a radially inward direction and the second plurality of openings are punched in a radially outward direction.

6. The method according to claim 1,
   wherein the removed body of material includes a portion of a periphery of the at least two of the first openings.

7. A method for manufacturing a rolling element bearing comprising:
   providing a bearing cage blank made from a metal plate,
   punching a plurality of first openings through the metal plate in a first direction to form a plurality of snap surfaces;
   after punching the plurality of first openings, punching a plurality of second openings through the metal plate in a second direction opposite the first direction to form a plurality of pockets, the second openings intersecting at least two of the first openings and removing a body of material from between the at least two of the first openings;
   snapping a plurality of rolling elements into the pockets; and
   placing the bearing cage and plurality of rolling elements between a first bearing ring and a second bearing ring.

8. The method according to claim 7,
   wherein the punching the plurality of first openings removes a plurality of sections of the metal plate.

9. The method according to claim 7,
   wherein the removed body of material includes a portion of a periphery of the at least two of the first openings.

* * * * *